(12) United States Patent
Ferlitsch (10) Patent No.: US 7,936,468 B2
(45) Date of Patent: May 3, 2011

(54) SYSTEMS AND METHODS FOR LOAD BALANCING TONER USE IN A PRINTER POOL

(75) Inventor: Andrew Rodney Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1186 days.

(21) Appl. No.: 10/673,687

(22) Filed: Sep. 29, 2003

(65) Prior Publication Data

US 2005/0068562 A1 Mar. 31, 2005

(51) Int. Cl.
*G06F 3/12* (2006.01)
(52) U.S. Cl. .......................... 358/1.15; 399/61; 358/1.1
(58) Field of Classification Search .................. 358/1.7, 358/1.1, 1.15, 403, 448, 296, 1.6; 705/26; 399/27
See application file for complete search history.

(56) References Cited

U.S. PATENT DOCUMENTS

| | | | | |
|---|---|---|---|---|
| 5,377,016 A | * | 12/1994 | Kashiwagi et al. | 358/403 |
| 5,859,711 A | * | 1/1999 | Barry et al. | 358/296 |
| 6,348,971 B2 | * | 2/2002 | Owa et al. | 358/1.15 |
| 6,700,678 B1 | * | 3/2004 | Luman | 358/1.15 |
| 7,161,707 B1 | * | 1/2007 | Fukushima et al. | 358/1.6 |
| 7,444,088 B2 | * | 10/2008 | Radulski et al. | 399/27 |
| 2002/0026379 A1 | * | 2/2002 | Chiarabini et al. | 705/26 |

FOREIGN PATENT DOCUMENTS

JP 2002011923 A * 1/2002

* cited by examiner

*Primary Examiner* — Mark K Zimmerman
*Assistant Examiner* — Lennin Rodriguez
(74) *Attorney, Agent, or Firm* — Kirton & McConkie; Michael F. Krieger; Adam D. Stevens (57) ABSTRACT

Systems and methods for load balancing toner use of multiple printer devices such that the printer devices more evenly consume their respective toner in the rendering of print jobs. A printer device printing order is dynamically set based on printer toner, wherein the dynamic nature of setting the includes monitoring toner status on each printer device, monitoring toner levels on each printer device, setting the preference order by toner status, setting the preference order by toner level, redirecting print jobs from out-of-toner printer devices to printer devices with toner, redirecting print jobs from low-toner printer devices to printer devices with toner, and/or the like. Accordingly, the printer device printing order is dynamically set according to toner utilization, while still preserving the load balancing of print jobs in the system.

26 Claims, 10 Drawing Sheets

SYSTEMS AND METHODS FOR LOAD BALANCING TONER USE IN A PRINTER POOL

BACKGROUND OF THE INVENTION

1. Field of the Invention

The present invention relates to rendering print or fax jobs in a multi-printer environment. In particular, the present invention relates to systems and methods for load balancing toner use by printer devices of a multi-printer environment (e.g., printer pool or other multi-printer environment), such that the printer devices more evenly consume their respective toner in the rendering of print or fax jobs.

2. Background and Related Art

Current printing techniques allow for printing to occur in a number of system configurations. For example, one system configuration includes a printer pool, wherein a pool of printers is available for use in rendering print jobs. Printer pools are currently implemented in a variety of manners, including: being virtual driver based, spooler/print processor based, port based, server based and firmware based.

In one example of a printer pool, jobs are allocated to the first available printer, where availability may be defined as the higher of: (i) Ready To Print; (ii) Ready to Print—Warming Up; (iii) Ready to print—Power Save; or (iv) Busy. Some techniques may take into account the warm up and power up times and time to availability for busy printers by estimating when the printers will complete their current job load. Using such techniques, a more even distribution of jobs is obtained over the printer pool, resulting in shorter wait times and higher throughput.

While the utilization of printer pools is currently available for the rendering of print jobs, problems currently exist. For example, as a printer pool is used, the print load averaged over time is typically less than the maximum capacity of the pool. Accordingly, all of the printers of the pool are not actively printing all of the time. Instead, a preferred printer is used more than other printers in the printer pool, which leads to an uneven distribution of toner consumption in the printer pool. The uneven distribution of toner consumption occurs due to an unequal distribution of load over time, wherein print jobs are distributed based on the printer availability.

These problems with the current techniques are illustrated by the following example: Consider a printer pool of three printers, wherein each printer has the same load capacity, which is designated as "L". Accordingly, in this example, the load capacity of the printer pool would be 3L. If the average aggregate load on the printers is 1.75L, then the average distribution of load on the printer pool may be:

| | |
|---|---|
| Printer 1 | 100% capacity |
| Printer 2 | 50% capacity |
| Printer 3 | 25% capacity |

In the above example, preference is given to printer 1. If printer 1 is busy (100/175=57%), then the job is sent to printer 2. If printer 2 is busy (50/175=28%), then the job is sent to printer 3. Given this distribution, and a toner life of 30 days at 100% load capacity, the printers will consume their respective toners in the following time periods:

| | |
|---|---|
| Printer 1 | 30 days |
| Printer 2 | 60 days |
| Printer 3 | 120 days |

In the current example, the 3 printers will exhaust their toner at substantially different times, which leads to extra overhead in maintaining the printers. In the above example, the toner cartridges have to be changed at three separate times. This means that if the toner of the printers is maintained by an outside service, the service company will have to come on-site on three separate occasions. Additionally, by an uneven consumption of toner, it is difficult to predict and maintain 'just enough' extra toner supply on site. If the predictive amount is incorrect, additional toner may need to be purchased outside of normal purchase cycles.

An uneven consumption of toner can also lead to poor output quality on one or more printers in a printer pool or printer group (e.g., copy and job splitting). If the pool selection is based only on availability, a large print job could be sent to a printer that is low on toner. In this case, the toner may become exhausted before the job is printed, or the amount of toner laid on the paper may increasingly diminish throughout the job.

Thus, while techniques currently exist that are used to render print jobs using a printer pool, challenges still exist, including an uneven distribution of toner consumption in a printer pool. Accordingly, it would be an improvement in the art to augment or even replace current techniques with other techniques.

SUMMARY OF THE INVENTION

The present invention relates to rendering print or fax jobs in a multi-printer environment. In particular, the present invention relates to systems and methods for load balancing toner use by printer devices of a multi-printer environment (e.g., printer pool or other multi-printer environment), such that the printer devices more evenly consume their respective toner in the rendering of print jobs.

Implementation of the present invention takes place in association with a computer system configuration that includes a plurality of printer devices that are used to render print jobs. In at least some implementations of the present invention, when multiple printer devices are available to render one or more print jobs, the printer device printing order is dynamically set based on consumption and/or levels of printer toner.

The dynamic nature of setting the printer device printing order is made possible by performing such processes as monitoring toner status on each printer device in the printer pool; monitoring toner levels on each printer device in the printer pool; setting the preference order in the printer pool by toner status; setting the preference order in the printer pool by toner level (i.e., highest to lowest); redirecting print jobs from out-of-toner printer devices to printer devices with toner; redirecting print jobs from low-toner printer devices to printer devices with toner; and/or the like.

While the methods and processes of the present invention have proven to be particularly useful in the area of rendering print jobs in a printer pool, those skilled in the art will appreciate that the methods and processes can be used in a variety of different applications and in a variety of different system configurations where a medium (e.g., toner or other medium) is used to render one or more jobs, and where one or more rendering devices (e.g., printer or other rendering device) are available to render the jobs. Further, the methods and processes of the present invention can be used in a single printer device having multiple print engines.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to rendering print or fax jobs in a multi-printer environment. In particular, the present invention relates to systems and methods for load balancing toner use by printer devices of a multi-printer environment (e.g., painter pool or other multi-printer environment), such that the printer devices more evenly consume their respective toner in the rendering of print or fax jobs.

In the disclosure and in the claims, the term "print job" shall refer to any type of job that can be rendered using toner. Examples include fax jobs, scan jobs, text and/or graphics for printing, etc.

Embodiments of the present invention embrace a computer system configuration that includes a plurality of printer devices that are used to render print jobs in at least some embodiments of the present invention, when multiple printer devices (or multiple print engines within a printer device) are available to render one or more print jobs, the printer device printing order is dynamically set based on printer toner. As will be discussed below, the dynamic nature of setting the printer device printing order is made possible by performing such processes as monitoring toner status on each printer device in the printer pool; monitoring toner levels on each printer device in the printer pool; setting the preference order in the printer pool by toner status; setting the preference order in the printer pool by toner level (i.e., highest to lowest); redirecting print jobs from out-of-toner printer devices to printer devices with toner; redirecting print jobs from low-toner printer devices to printer devices with toner; and/or the like.

The following disclosure of the present invention is grouped into two subheadings, namely "Exemplary Operating Environment" and "Load Balancing Toner Use." The utilization of the subheadings is for convenience of the reader only and is not to be construed as limiting in any sense.

Exemplary Operating Environment

Figure 1:
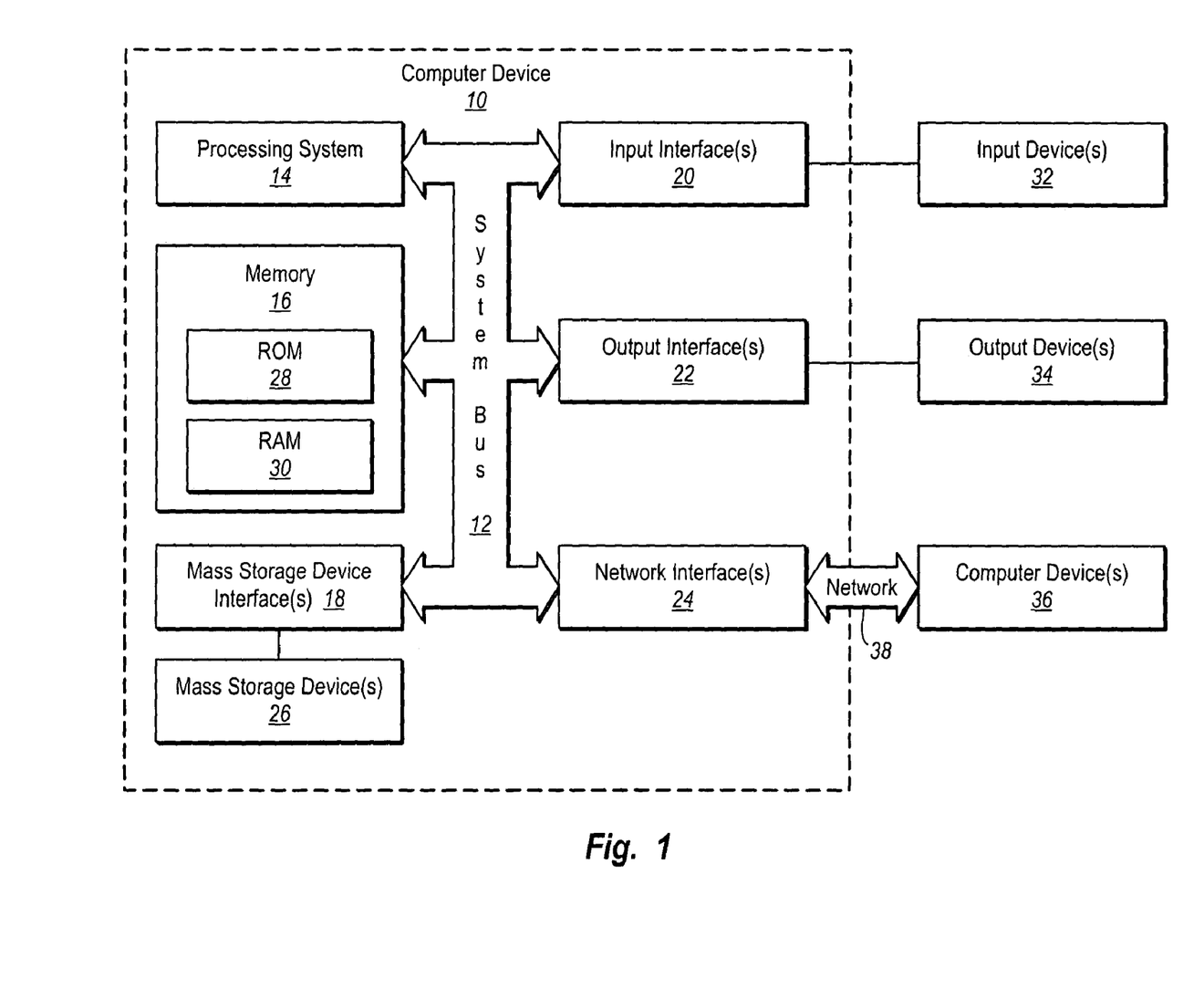
FIG. 1 illustrates a representative system that provides a suitable operating environment for use of the present invention.

FIG. 1 and the corresponding discussion are intended to provide a general description of a suitable operating environment in which the invention may be implemented. One skilled in the art will appreciate that the invention may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special purpose computer capable of performing a limited number of functions. Computer-executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAMS 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Those skilled in the art will appreciate that embodiments of the present invention embrace a variety of different system configurations. For example, some embodiments of the present invention embrace local printer environments, network printer environments, remote printer environments, etc. In one embodiment, the system configuration includes one or more printer devices (e.g., multifunctional peripherals "MFP" or other printer devices), one or more client computer devices, optionally a server computer device, and a network communication that enables transmitting information relating to print jobs. Other embodiments of the present invention embrace one or more computer devices locally or remotely connected to a plurality of printer devices for the rendering of print jobs.

Figure 2:
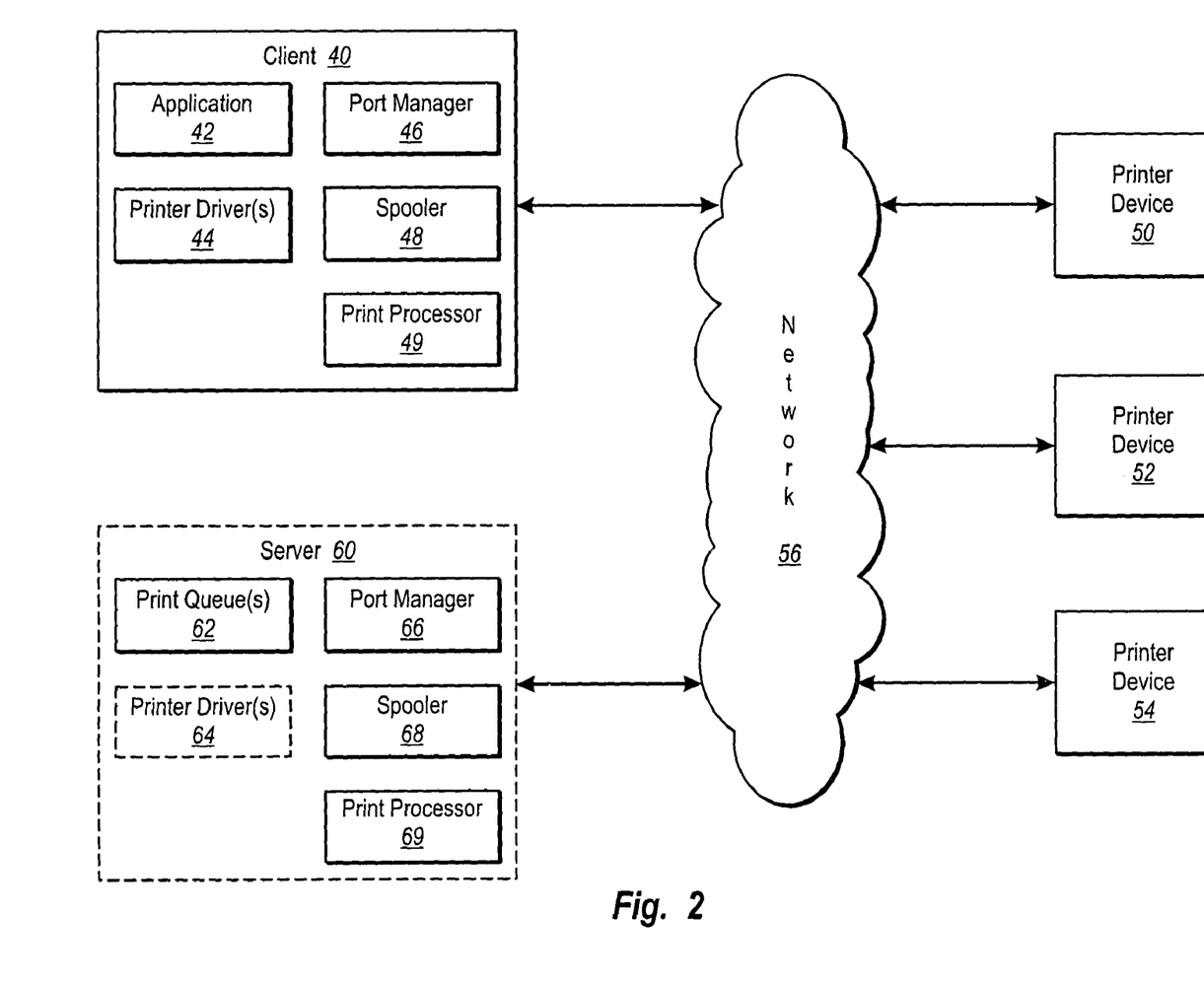
FIG. 2 illustrates a representative system configuration for rendering print jobs, wherein the system configuration includes a plurality of printer devices for rendering the print jobs.

Thus, while those skilled in the art will appreciate that embodiments of the present invention may be practiced in a variety of different environments with many types of system configurations, FIG. 2 provides a representative networked configuration that may be used in association with the present invention. While FIG. 2 illustrates an embodiment that includes a client, three printer devices, and optionally a print server connected to a network, alternative embodiments include more than one client, less than three printer devices, more than three printer devices, no server, and/or more than one server connected to a network. Moreover, other embodiments of the present invention include local, networked, or peer-peer printing environments, where one or more computer devices are connected to a plurality of printing devices for rendering print jobs. Some embodiments include wireless networked environments, or where the network is a wide area network, such as the Internet.

The representative system of FIG. 2 includes a computer device, illustrated as client 40, which is connected to a plurality of peripheral devices (illustrated as printer device 50, printer device 52, and printer device 54) across network 56. In FIG. 2, printer devices 50-54 may be any type of printing device that may be used to render a print job. In one embodiment, the capabilities of any one of the printer devices are heterogeneous to the capabilities of any other printer device (e.g., at least one of the capabilities of one printing device, such as printer device 50, are different from the capabilities of another printer device, such as printer device 52). In another embodiment, the capabilities of the printer devices are homogeneous.

As provided above, while printer devices 50-54 are connected to network 56, embodiments of the present invention embrace the use of peripheral devices (e.g., printer devices) that are locally connected to a computer device, that are configured in a peer-to-peer printing environment, or that are configured in a wireless network environment.

In the illustrated embodiment, client 40 includes a software application 42, one or more print drivers 44, a port manager 46, a spooler 48, and a print processor 49. A server 60 is optionally included having, for example, one or more print queues 62, one or more printer drivers 64, a port manager 66, a spooler 68, and a print processor 69.

In other embodiment, a print job is constructed without the use of a printer driver (i.e., driverless printing), such as a print job that is generated directly by or through the assistance of a print filter, an application or the direct transmission of an image or document format that is supported by the device.

Thus, in accordance with the illustrated embodiment and other embodiments of the present invention, print jobs are selectively and dynamically rendered in a multi-printer device environment, as will be further discussed below.

Load Balancing Toner Use

Embodiments of the present invention relate to systems and methods for load balancing toner use by printer devices of a printer pool such that the printer devices more evenly consume their respective toner in rendering print jobs. A printer device printing order is dynamically set by performing such processes as monitoring toner status on each printer device in the printer pool; monitoring toner levels on each printer device in the printer pool; setting the preference order in the printer pool by toner status; setting the preference order in the printer pool by toner level (i.e., highest to lowest); redirecting print jobs from out-of-toner printer devices to printer devices with toner; redirecting print jobs from low-toner printer devices to printer devices with toner; and/or the like.

Figure 3:
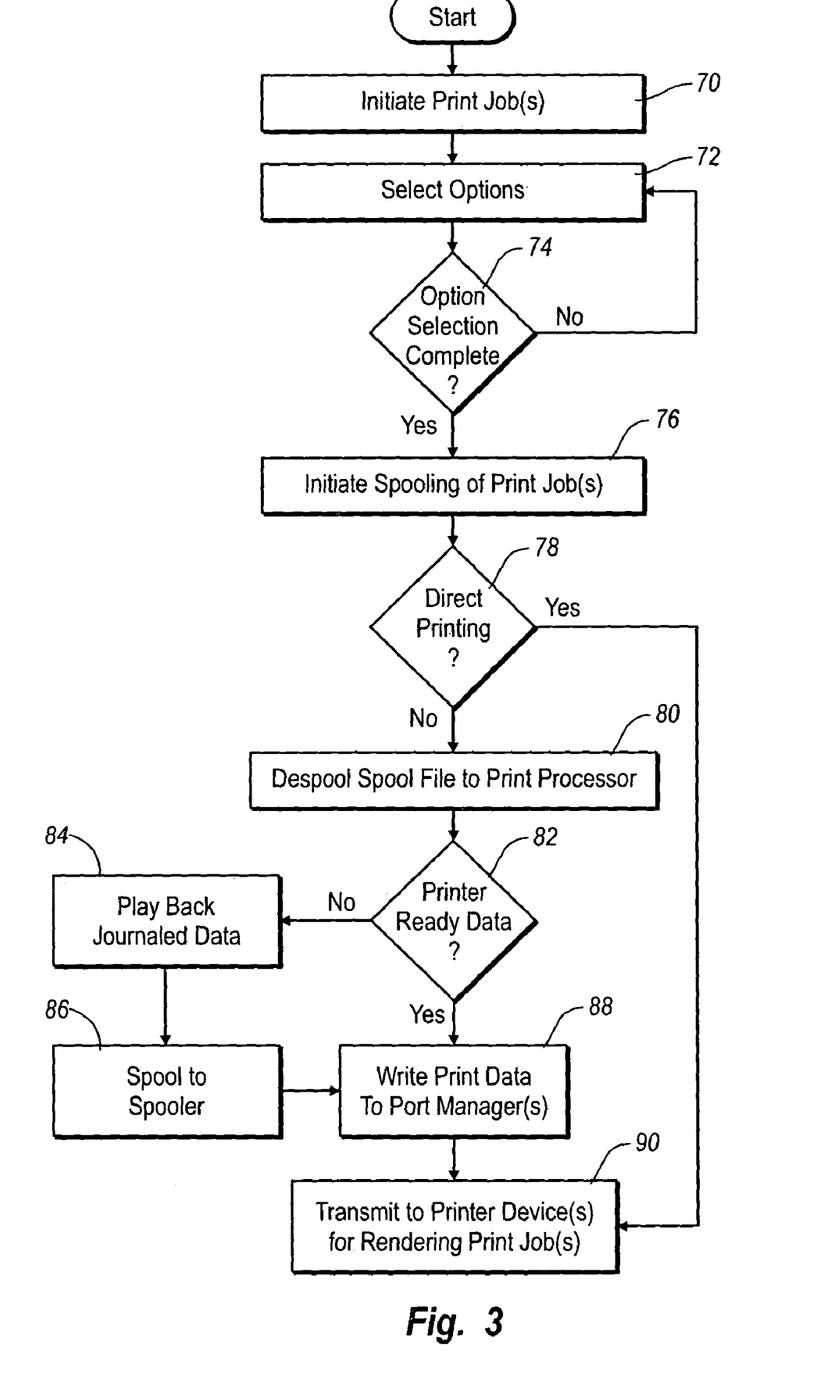
FIG. 3 is a flow chart that represents representative processing in accordance with an embodiment of the present invention.

With reference now to FIG. 3, a flow chart is illustrated that represents representative processing that is performed within a system that includes two or more compatible printers or printer devices (e.g., identical PDL interpreters) connected in a local, remote or network print environment, a computing device capable of spooling a print job, and optionally a printer driver and print processor compatible with the printing devices (e.g., driver based printing vs. direct printing), such as in the Microsoft® Windows 98/Me, NT/2k XP and Server 2003 operating systems.

At step 70, a user initiates one or more print jobs that include one or more documents, each having one or more pages, wherein one or more copies are to be rendered. The print job(s) may be preprocessed into printer ready data, such as an application rendering its output into a page description language (PDL), such as PCL, Postscript, PDF, TIFF, etc. The print job may also be journaled, where the rendering instructions are recorded, and the playback of the rendering instructions is deferred, such as with an enhanced meta file (EMF), a printer meta file (PMF), or the like.

Upon initiation of the print job(s) at step 70, the user selects a command, sequence of commands, or other stimulus to the computer device, to indicate an intention to spool the print job(s). The computer device responds to the user by presenting the user a dialog (e.g., a printer user interface, command line query, front panel display, etc.) so that the user can select options relating to the spooling of the print job(s), as indicated by step 72. One of the options is the selection of one or more printer devices (e.g., printer, plotter, MFP, CD burner, fax machine, etc.) to which the print job(s) are to be despooled. Once the printer device is selected, the computer device responds by loading a printer driver and print processor associated with the printer devices. The printer driver responds, automatically or by user initiation, to the user by presenting the user a dialog in which the user may select options relating to the printing device's capabilities (e.g., print quality, paper size, orientation, tray selection, manual feed, duplexing, collation, stapling, hole-punching, watermarks, etc.)

At decision block 74, a determination is made as to whether or not all the selection of the various options is complete. If it is determined that the selection is not complete, execution returns back to step 72. Once the user has completed the selecting options specific to the print job(s) and the printing device(s), the computer device initiates the spooling of the print job(s) at step 76. In some embodiments, the initiation of the spooling includes having the printer driver construct print job specific information (e.g. DEVMODE in Microsoft® operating systems), compile rendering instructions, and render preprocessed data into printer ready data or record journaled data for deferred playback. The print job(s) may, partly or in whole, be already rendered into printer ready data. Thus, a step of compiling rendering instructions may be skipped partly or entirely.

A determination is made at decision block 78 as to whether or not direct printing is to be employed. In direct printing systems, the user spools one or more print jobs without preprocessing (i.e., rendering or journaling) the document and/or image data through a printer driver. In these systems, the print data remains in the native document and/or image format, and the printing device is assumed to have the capability of interpreting/processing the respective formats. In one embodiment utilizing a direct printing system, the dialog presented to the user for selecting options specific to the printing device's capabilities includes a dialog on cluster printing. In an alternate embodiment, the dialog for selecting, cluster specific options may be presented by an application, background process, print processor, spooler, print assistant (i.e., any component not otherwise part of the print subsystem that is inserted into the printing process) or be pre-specified. Thus, in direct printing, the print data is not be preprocessed by a printer driver. Instead, the print job includes print job options and the document/image data in native format, and is spooled directly to the spooler.

Accordingly, if it is determined at decision block 78 that direct printing is to be employed, executing proceeds to step 90, wherein the one or more print jobs are provided to one or more printer devices for rendering. Alternatively, if direct printing is not to be employed, execution proceeds to step 80, where a spool file is despooled to a print processor.

The output from the print driver (i.e., spooled print job) is referred to as a spool file, with the contents generally referred to as spool data, and may be on disk, in memory, in cache or other forms of storage compatible with the computing device. Once the spool file is completed, the spooler despools (immediately or delayed) the spool file to the associated print processor for the selected printer device(s), as indicated at step 80. At step 82, the print processor reads the spool file and determines if the content is preprocessed printer ready data (e.g., RAW mode in a Microsoft® operating system). If the print data is printer ready data, execution proceeds to step 88, where the print processor writes the print data directly to the port manager(s) of the corresponding printing device(s).

Alternatively, if it is determined at decision block 82 that the content of the spool file is journaled (e.g., EMF mode in a Microsoft® operating system), the print processor plays back the journaled data to the printer driver(s) associated with the corresponding printing device(s) at step 84. The printer driver(s) then render the journaled data and spool the printer ready data to the spooler at step 86. Execution then proceeds to step 88, where the spooler writes the printer ready data directly to the port manager(s) of the corresponding printing device(s).

Once the print data is written to the port manager at step 88, execution proceeds to step 90, where the print data is transmitted to the printer device(s) for the rendering of the print job(s).

In some embodiments, the step of playing back the journaled data to the printer driver is alternatively deferred to a printer server. In this case, the spooler writes the journaled data directly to the port manager(s) of the printer server(s) associated with the corresponding printing devices. The journaled data is then spooled to a print queue on the printer server. The server spooler (i.e., on the printer server) despools (immediately or delayed) the spool file to the associated printer server for the selected printing device(s). The server print processor plays back the journaled data to the server printer driver(s) associated with the corresponding printing device(s). The server printer driver(s) then render the journaled data and spool the printer ready data to the server spooler. The server spooler writes the printer ready data directly to the server port manager(s) of the corresponding printing device(s).

Figure 4:
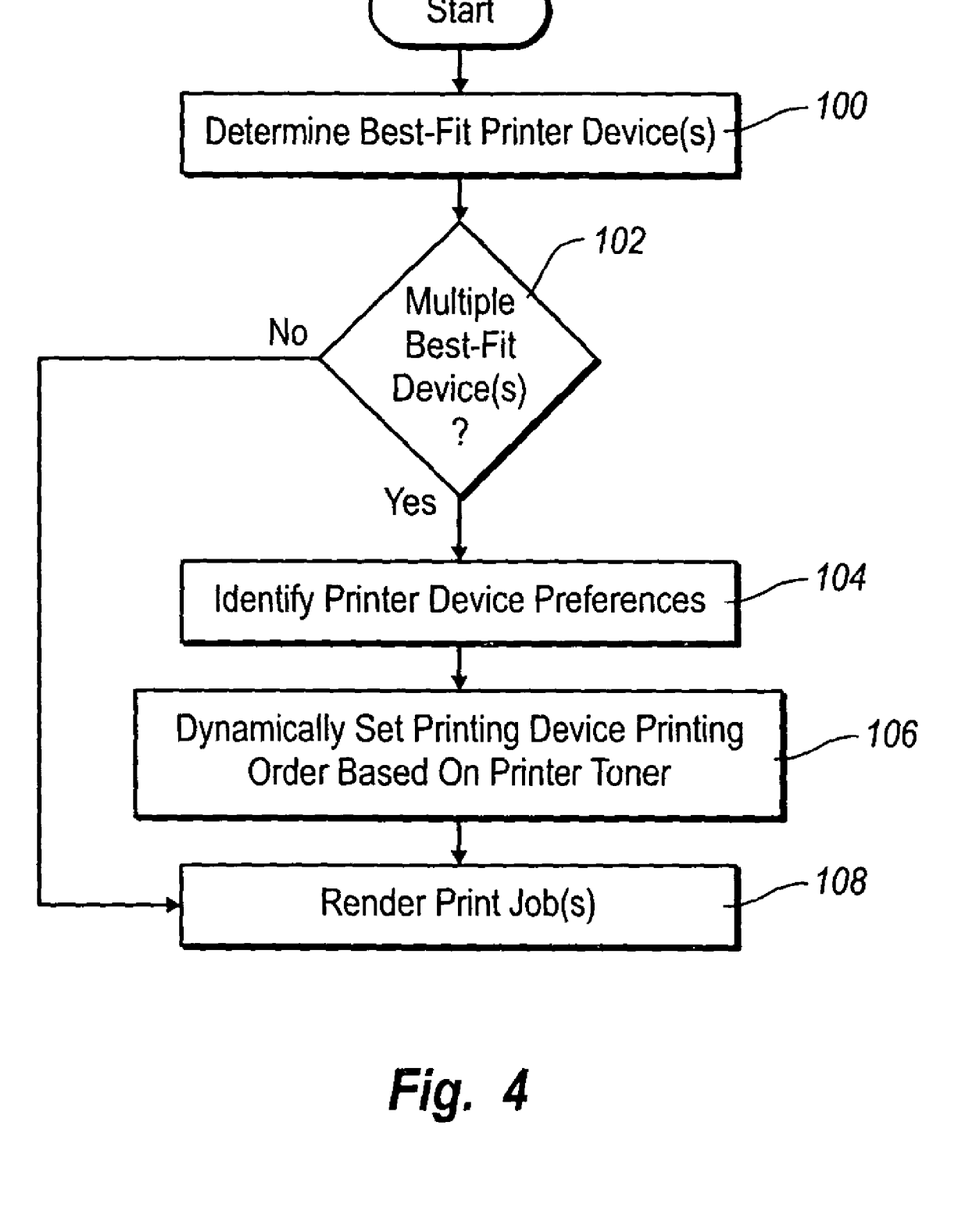
FIG. 4 is a flow chart that represents representative processing relating to an embodiment for dynamically setting printing device printing order based on printer toner.

With reference now to FIG. 4, a flow chart is illustrated that provides representative processing relating to an embodiment for dynamically setting a printer device printing order based on printer toner. In FIG. 4, execution begins at step 100, wherein one or more best-fit printer devices are determined. In one embodiment a printer driver selects the best-fit printer from a printer pool. In an alternate embodiment, a later print subsystem component, such as a spooler, print processor, port manager, printer server, print assist or printer firmware, selects the best-fit printer from a printer pool. In some embodiments, the print data stream may be modified by the print subsystem component to print correctly on the targeted printing device(s). In other embodiments, the printer driver or later print subsystem component selects the best-fit printers from a printer group for job splitting (i.e., copy splitting, document splitting and color/black and white separation).

The determination made on which are the best-fit printer devices may be made in a number of manners. For example, it may be based on (i) first available; (ii) time to availability; (iii) capabilities matching; (iv) printer speed; or an other basis.

Regarding a first available printer device, considerations may include a printer that is ready to print, (i.e., online, not in an error state, and not busy printing) and/or differences in the ready to print state, such as in the warm up cycle and power save modes.

Regarding the time to availability, considerations may include making estimates of when busy printers will complete their current job load and be available. Further considerations may include the time for warm up and power up cycles for printers in warm up or power-save modes. A printer that is otherwise ready to print has zero time to availability (i.e., available immediately).

Regarding the capabilities matching, the determination is based on printers whose capabilities best match the requirements of the print job(s). The determination may consider capabilities emulation that can be performed by the computing device that are otherwise not supported on the printing device (e.g., collation).

Regarding the printer speed, the determination is based on printers that will render the print job(s) in the least amount of time, or the combined time to render between the computing and printing devices, when some capabilities are emulated on the computing device.

With reference back to FIG. 4, once the best-fit printer devices are determined at step 100, a determination is made at decision block 102 as to whether or not multiple best-fit devices have been identified. If it is determined that multiple printer devices have not been determined, then execution proceeds directly to step 108 for the rendering of the print job(s).

Alternatively, if it is determined at decision block 102 that multiple best-fit devices have been identified, a resolution is made in order to select a particular printer device for a given print job or portion of a print job. In the present example, the resolution is by preference order, wherein the printers in the pool or group are assigned a preference (e.g., from highest to lowest). The preference order may be statically set or modifiable at print-time.

Thus, at step 104 the printer device preferences are identified. At step 106 the printing device printing order is dynamically set based on printer toner. In at least some embodiments, the preference order is dynamically set at run-time, based upon toner information. Execution then proceeds to step 108 for the rendering of the print job(s).

Figure 5:
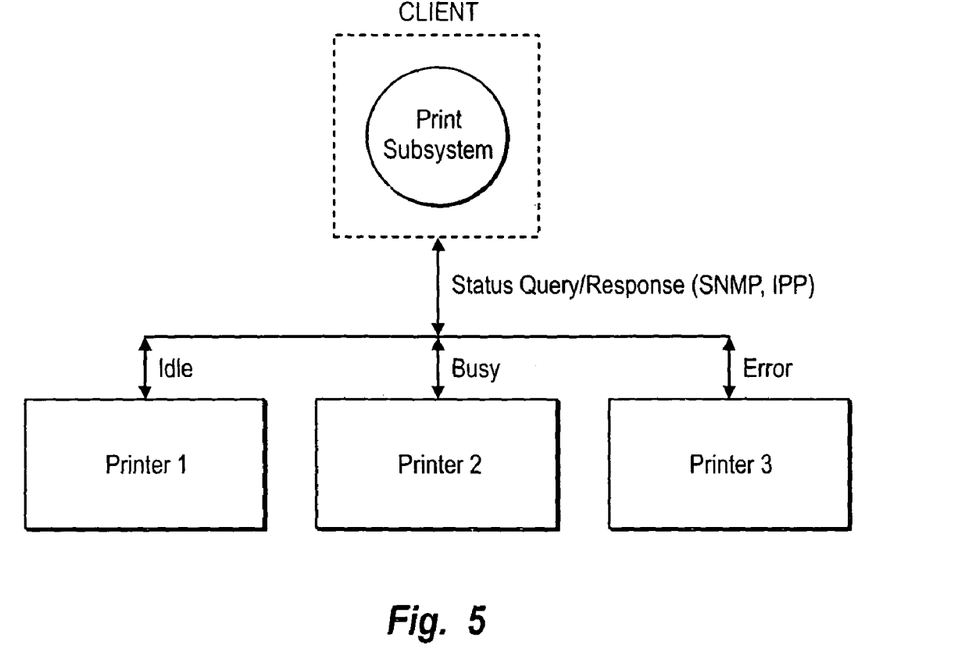
FIG. 5 is a representative block diagram illustrating an embodiment relating to providing toner load balancing based on printer device status.
Figure 6:
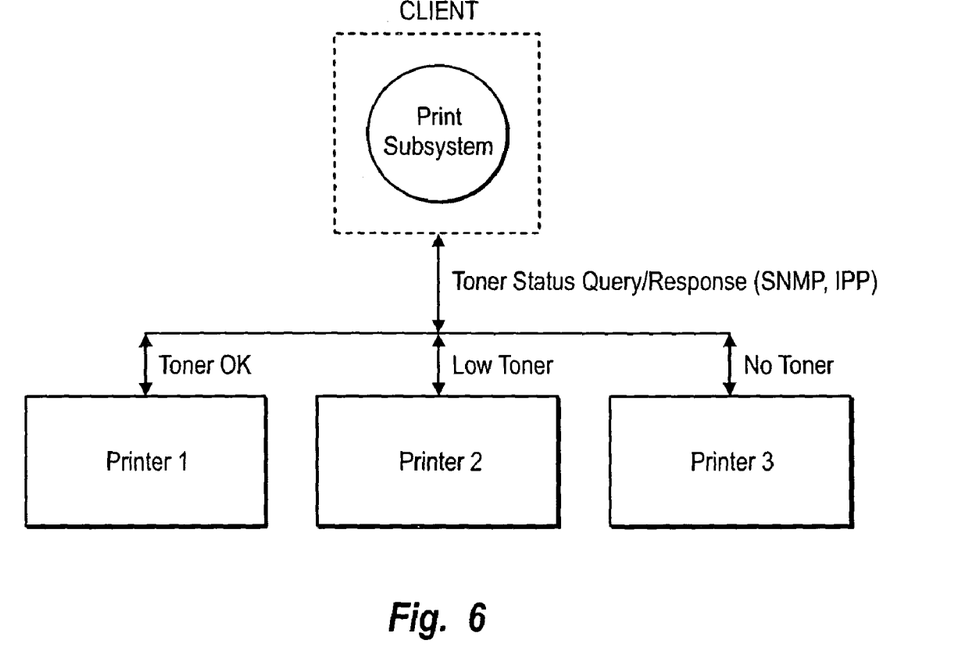
FIG. 6 is a representative block diagram illustrating an embodiment relating to providing toner load balancing based on toner status.

With reference now to FIGS. 5-6, a representative embodiment is illustrated that relates to providing toner load balancing based on printer device status.

In at least some embodiments, the dynamic nature of setting the printer device printing order (step 106 of FIG. 4) is based on monitoring the toner status of each printer in the given printer pool or group. By way of example, the toner status is obtained by querying the printing devices, such as by utilizing SNMP, IPP, PJL USTATUS or a proprietary protocol. Generally, toner status may be categorized as: (i) Toner OK; (ii) Toner LOW (i.e., Low Toner); or (iii) Toner OUT (i.e., No Toner). If the toner status is the only available information on the toner consumption, then the toner status is used to set the printer preference order (step 106 of FIG. 4), where the "Out of Toner" status is considered an error state and the "Toner OK" is given a higher precedence than the "Toner LOW" status. FIG. 6 is a representative embodiment relating to providing toner load balancing based on toner status.

As an example, consideration is made wherein a two printer pool is utilized without toner consumption load balancing, wherein the printer preference order is printer 1 and then printer 2. If the printer pool is operated at low utilization (i.e., both printers are generally when a print job is provided for rendering), then most jobs will go to printer 1. This process will lead to a substantially faster consumption rate of toner by printer 1 than printer 2. Thus, the printer 1 will reach the "Toner Low" state substantially sooner than printer 2.

Applying the toner status to the preference ordering, once the printer 1 reaches the "Toner Low" state, the preference ordering dynamically changes to printer 2 and then printer 1. Thus, after the preference order change is made, most print jobs are then provided to printer 2, resulting in a reduction of toner consumption by printer 1 and an increase of toner consumption by printer 2 until the consumption rate of both printers are equalized (i.e., both printers reach toner low status).

Figure 7:
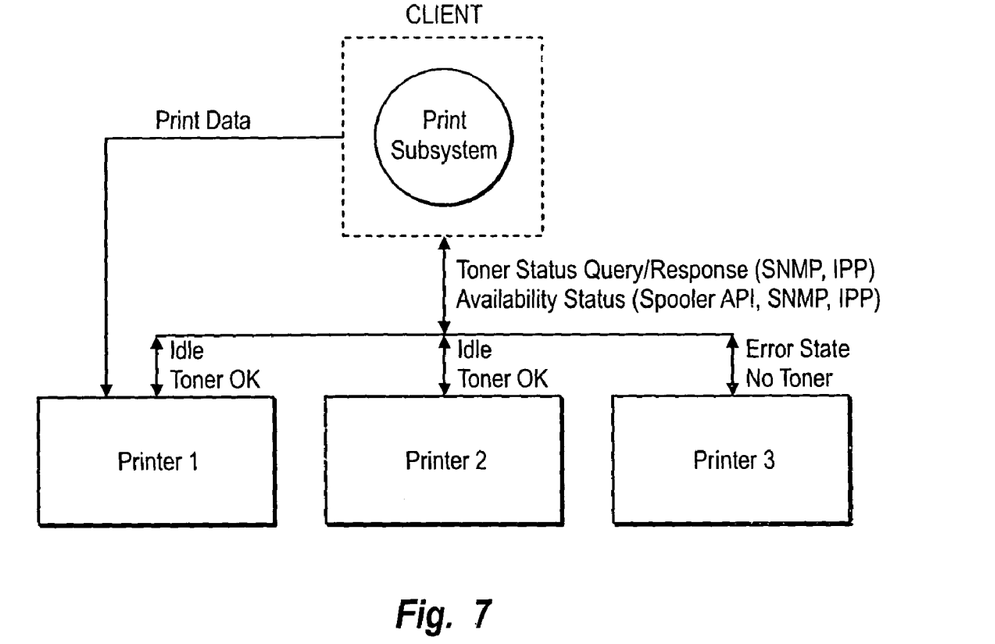
FIG. 7 is a representative block diagram illustrating an embodiment relating to providing toner load balancing based on preference ordering.
Figure 8:
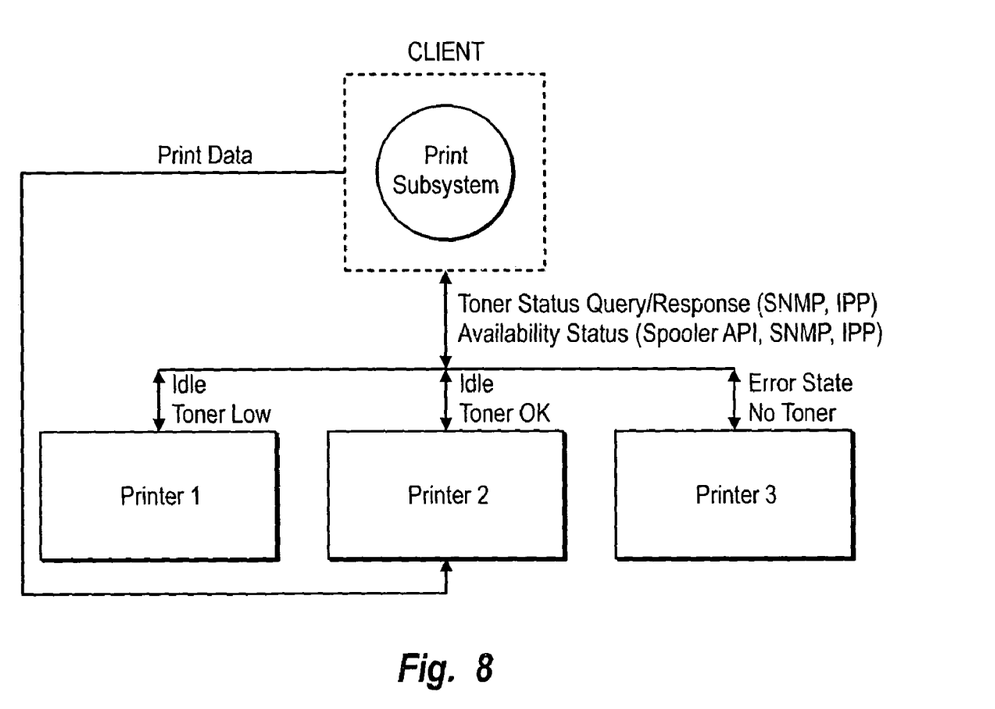
FIG. 8 is a representative block diagram illustrating an embodiment relating to providing toner load balancing based on preference ordering, wherein the toner supply is low.
Figure 9:
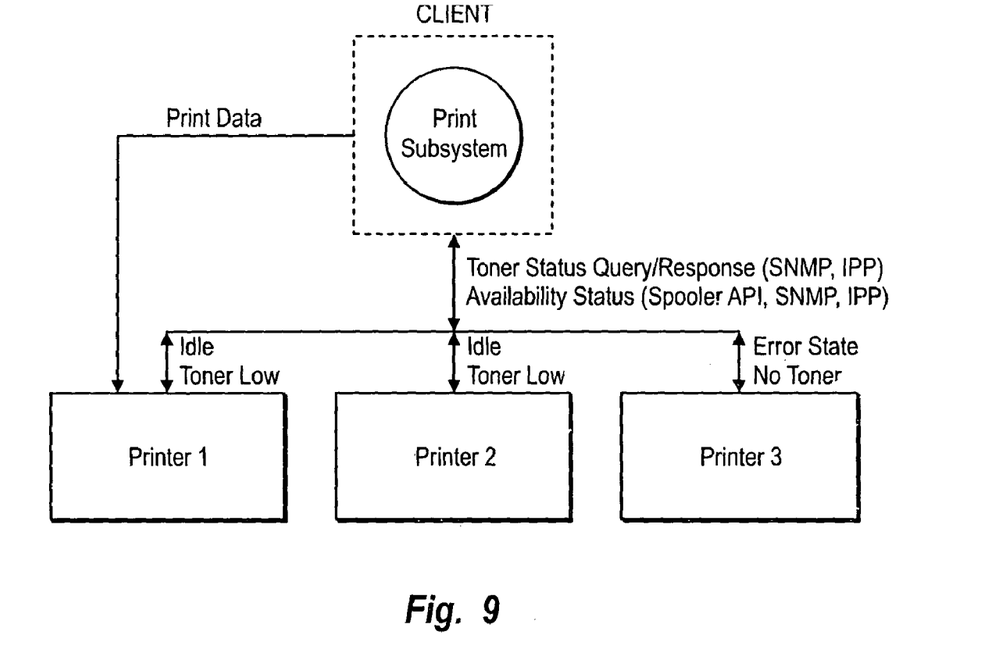
FIG. 9 is a representative block diagram illustrating an embodiment relating to providing toner load balancing based on preference ordering, wherein equalization is utilized.

Examples of such embodiments are provided in FIGS. 7-9. FIG. 7 is all embodiment relating to providing toner load balancing based on preference ordering. FIG. 8 is an embodiment relating to providing toner load balancing based on preference ordering, wherein the toner supply is low. FIG. 9 is an embodiment relating to providing toner load balancing based on preference ordering, wherein equalization is utilized.

While distinguishing only between low toner and non-low toner states may lead to one printer having a substantially larger usage of toner for an initial period of time and balancing does not occur until one printer enters the low toner status, those skilled in the art will appreciate that embodiments of the present invention embrace processes that provide enhanced load balancing.

By way of example, the above may be enhanced by the use of a round-robin process when printers are in a "Toner OK" status. Thus, when the only distinguishable printable toner states are "Toner OK" and "Toner Low", one printer may initially get substantially more of the print jobs, leading to faster initial toner consumption over the other printers until the printer enters a "Toner Low" status. Once the first printer reaches the "Toner Low" state, the next printer will get substantially more of the print jobs until that printer enters a "Toner Low" status. This behavior leads to the first printer spiking then dropping, the next printer spiking then dropping, and so forth.

Using a round-robin process on printers in the "Toner OK" state has the ability to level out the toner consumption peaks. When multiple printers in a pool are available and are in a "Toner OK" state, jobs are rotated through the available printers (round-robin). As a particular example of a representative round-robin process, in a two printer pool the print jobs may be first sent to printer 1, next to printer 2, next to printer 1, next to printer 2, and so forth. The round robin process leads to an averaging the load on the printers and levels out the consumption of toner while the printers are in the "Toner OK" state. Further, at least some embodiments of the present invention include a round robin process to level out the final toner consumption on printers in a "Toner Low" state.

In accordance with embodiments of the present invention, other factors may also or alternatively be considered for balancing toner consumption when a printer is in a "Toner Low" state. For example, the size of the print job may be considered. A large print job (i.e., greater than a particular threshold) combined with a "Toner Low" status may be considered an error state. In this embodiment, small print jobs are still sent to printers in a "Toner Low" state, while large print jobs are sent to printers in a "Toner OK" state.

Figure 10:
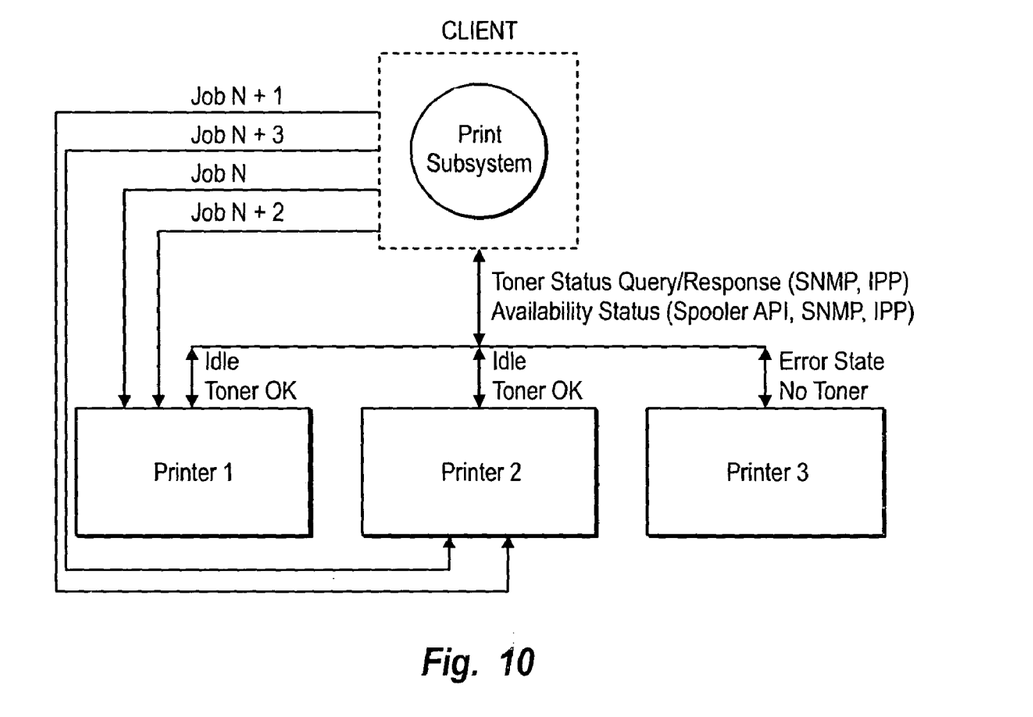
FIG. 10 is a representative block diagram illustrating an embodiment relating to providing toner load balancing based on preference ordering, wherein a round robin process is utilized.
Figure 11:
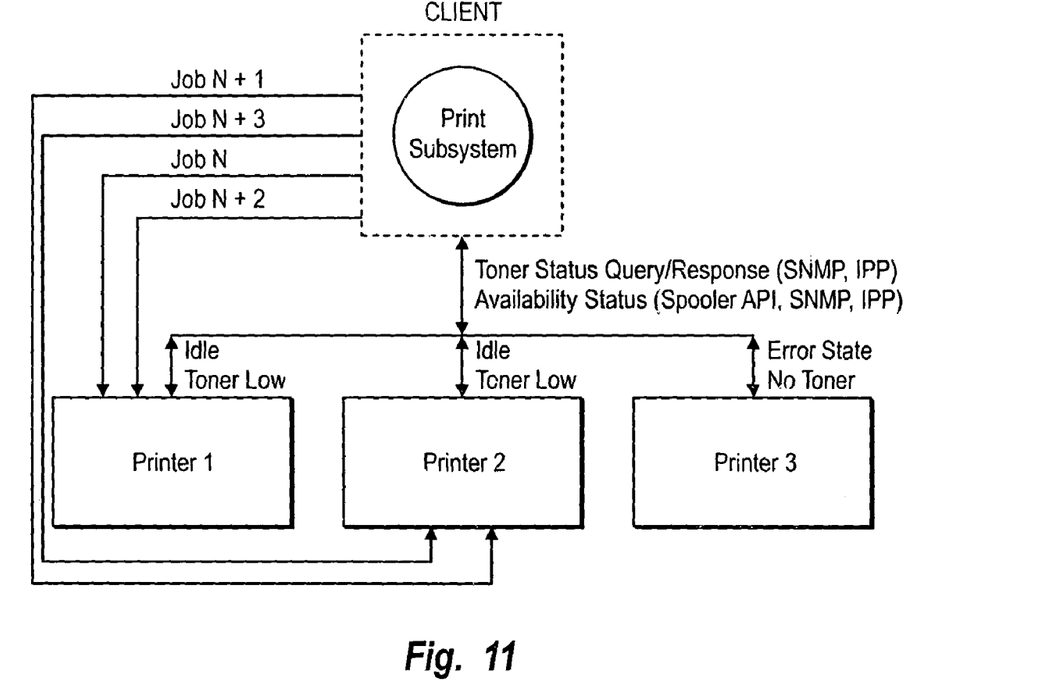
FIG. 11 is a representative block diagram illustrating an embodiment relating to providing toner load balancing based on preference ordering, wherein a round robin process is utilized and toner supply is low.
Figure 12:
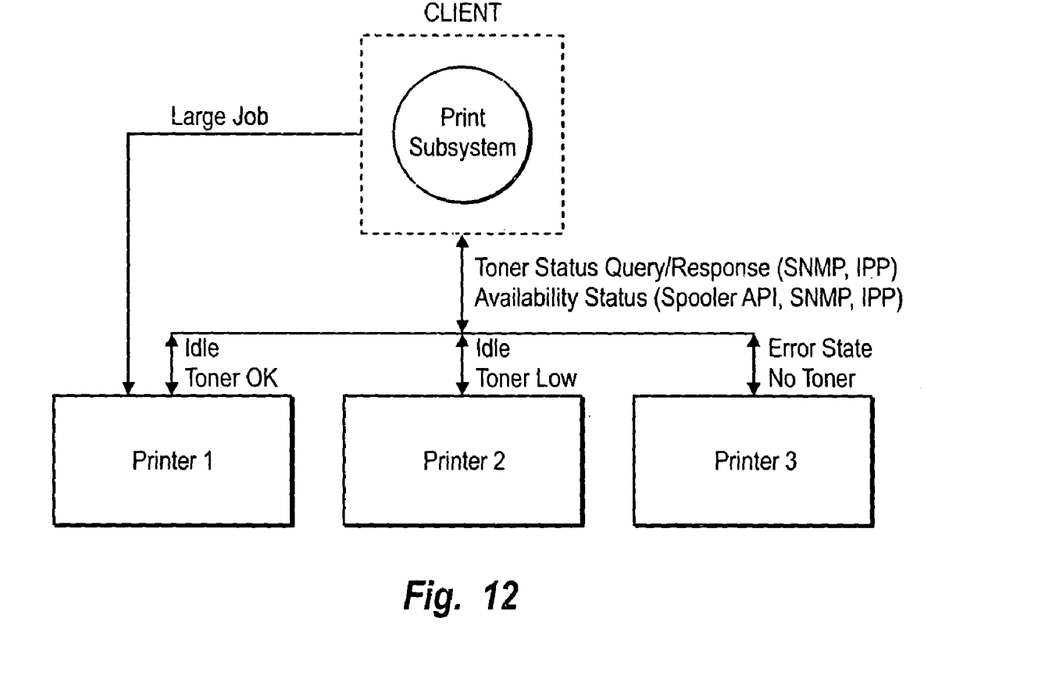
FIG. 12 is a representative block diagram illustrating an embodiment relating to providing toner load balancing based on preference ordering, wherein job size is considered.
Figure 13:
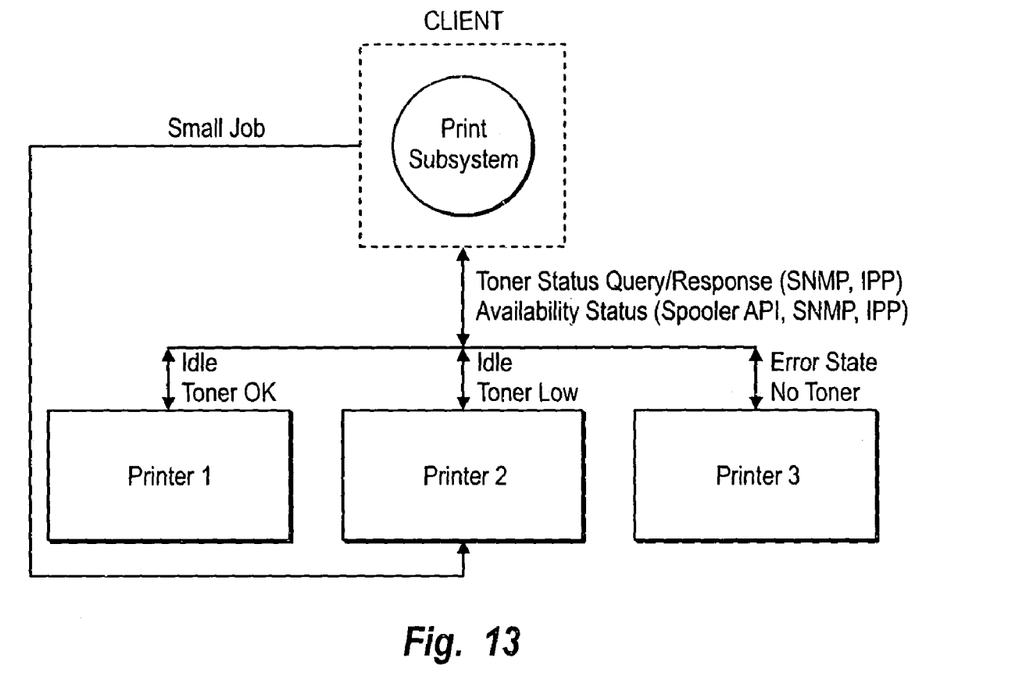
FIG. 13 is another representative block diagram illustrating an embodiment relating to providing toner load balancing based on preference ordering, wherein job size is considered.

Representative examples are illustrated in FIGS. 10-13. FIG. 10 is an embodiment relating to providing toner load balancing based on preference ordering that includes a round robin process. FIG. 11 is an embodiment relating to providing toner load balancing based on preference ordering, wherein a round robin process is utilized and toner supply is low. FIG. 12 is a representative block diagram illustrating an embodiment relating to providing toner load balancing based on preference ordering, wherein job size is considered. FIG. 13 is another representative embodiment relating to providing toner load balancing based on preference ordering, wherein job size is considered.

As provided herein, at least some embodiments of the present invention include the monitoring of the toner level of each printer in a printer pool or group. By way of example, the toner level is obtained by querying a printing device, such as by using SNMP, IPP, PJL USTATUS or a proprietary protocol. In some embodiments, the toner level is specified as a percentage of the remaining toner. Thus, a half used toner cartridge reports a toner level of 50% and a toner cartridge with 90% of the toner consumed reports a toner level of 10%.

Figure 14:
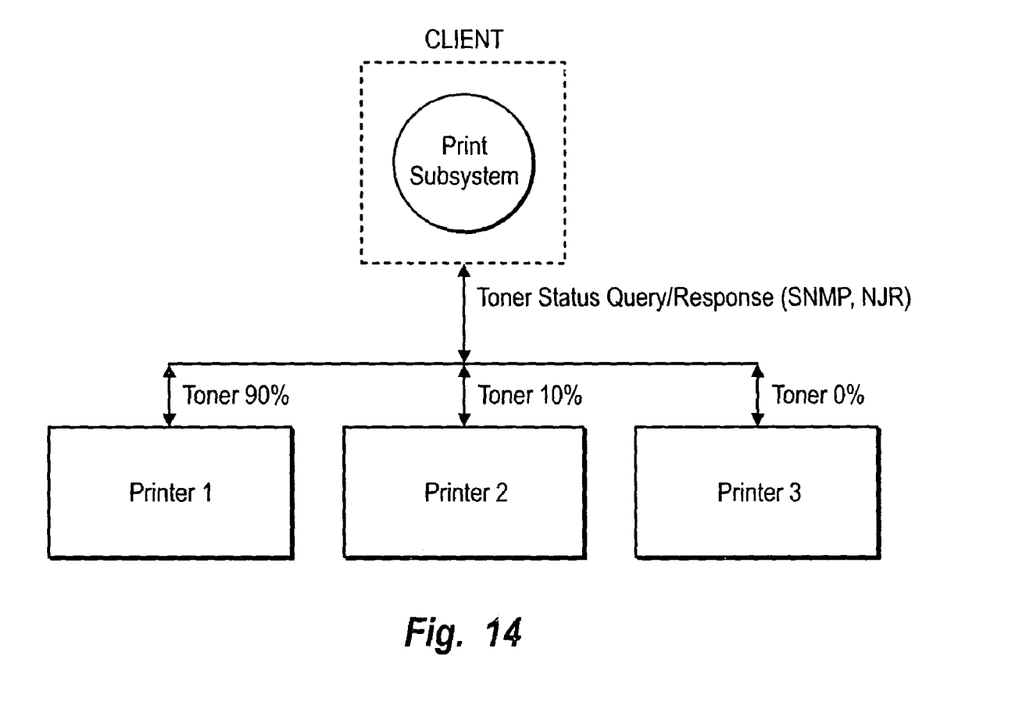
FIG. 14 is a representative block diagram illustrating an embodiment relating to providing toner load balancing based on a toner level.

Thus, some embodiments of the present invention alternatively or additionally use the toner level to dynamically set the printer preference order (step 106 of FIG. 4), wherein higher toner levels have precedence over lower toner levels. FIG. 14 is a representative embodiment relating to providing toner load balancing based on a toner level. Using a toner level to dynamically set a printer device printing order improves the toner consumption load over the round robin method. In the round robin method, the averaging tends to deviate at higher utilization loads and/or disproportionate sizes of print jobs.

Figure 15:
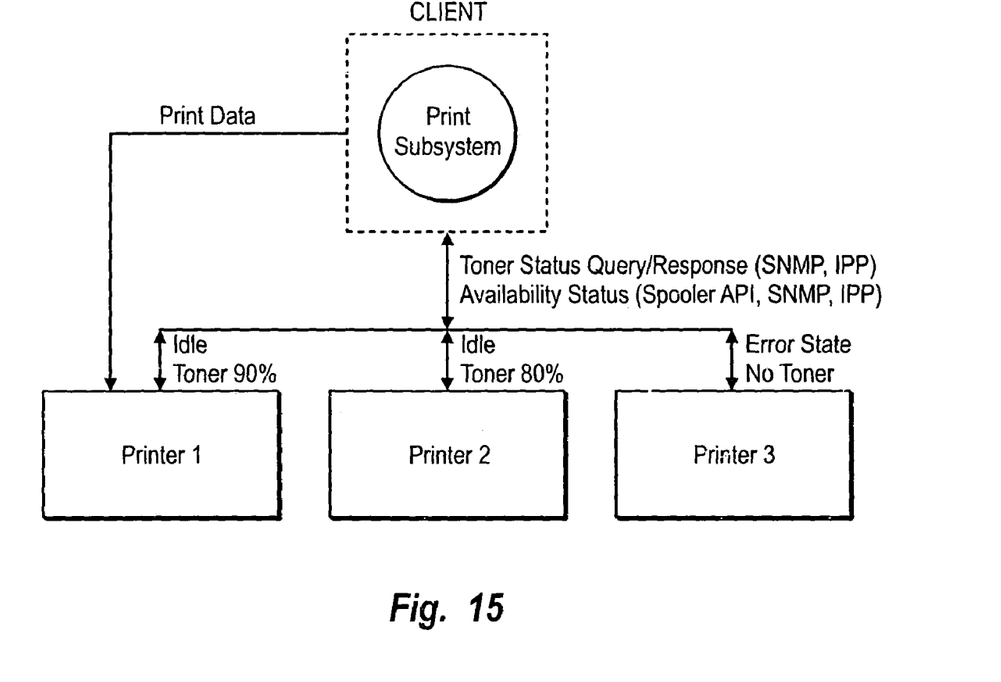
FIG. 15 is a representative block diagram illustrating an embodiment relating to providing toner load balancing based on preference ordering, wherein the toner level is considered.
Figure 16:
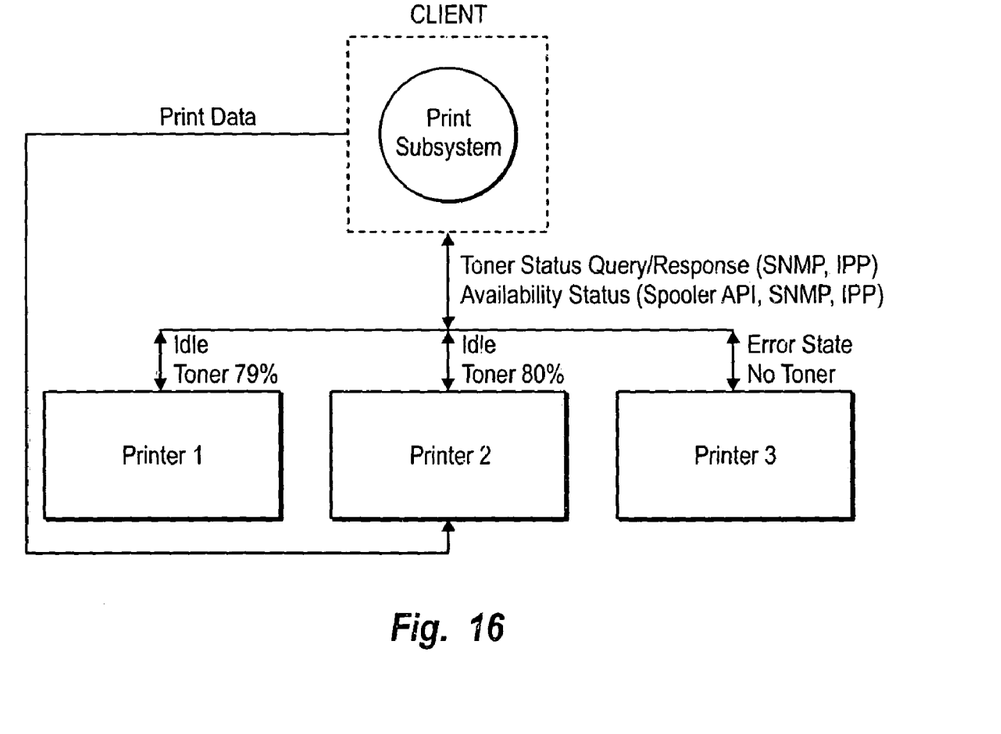
FIG. 16 is a representative block diagram illustrating an embodiment relating to providing toner load balancing based on preference ordering, wherein the toner level is considered.

Accordingly, the more refined the information regarding the toner level, the more the toner consumption load balancing is fine-tuned. For example, if the level of resolution is one percent (1%), then the toner consumption in the printer pool can be kept within one percent (1%) of each other. With reference to FIGS. 15-16, representative embodiments are provided relating to providing toner load balancing based on preference ordering, wherein the toner level is considered.

Those skilled in the art will appreciate that at least some embodiments of the present invention embrace dynamically selecting and establishing a preference order for job splitting processes (e.g., copy splitting, document splitting, color/black and white separation). Further, while examples provided herein have referenced spooling and despooling subsystems of Microsoft® operating systems, those skilled in the art will appreciate that embodiments of the present invention also embrace the spooling and despooling subsystems of other operating systems, such as the Apple® MacIntosh operating systems, Linux® operating systems, System V Unix® operating systems, BSD Unix® operating systems, OSF Unix® operating systems, Sun® Solaris operating systems, HP/UX operating systems, IBM® Mainframe MVS and AS/400 operating systems, etc.

Thus, as discussed herein, embodiments of the present invention embrace rendering print jobs in a printer pool. In particular, the present invention relates to systems and methods for load balancing toner use by printer devices of a printer pool such that the printer devices more evenly consume their respective toner in the rendering of print jobs. At least some embodiments of the present invention result in increasing utilization (e.g., high availability and high performance) of printing devices with cluster printing capabilities (e.g., pool printing and job splitting), while maintaining a balanced toner consumption.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a printing environment, a method for load balancing the use of toner, the method being performed by a computer device, comprising:
monitoring toner use of a plurality of printing devices configured to selectively render print jobs;
dynamically establishing an order for using the printing devices to render the print jobs based on toner information; and
causing the plurality of printing devices to more evenly consume their respective toner by using the order to select printing devices to render the print jobs as the print jobs are initiated so that the printing devices have similar respective toner consumption rates comprising:
using a round-robin process to distribute print jobs among only printing devices having a toner OK status until all printing devices reach a toner low status; and
using a round-robin process to distribute print jobs among all printing devices having a toner low status to level out final toner consumption.

2. A method as recited in claim 1, wherein dynamically establishing an order further comprises dynamically re-establishing the order for using the printing devices to render the print jobs based on updated toner information.

3. A method as recited in claim 2, wherein dynamically re-establishing the order for using the printing devices to render the print jobs comprises one of:
(i) redirecting at least a portion of a print job from an out-of-toner printing device to a printing device with toner;
(ii) redirecting at least a portion of a print job from a low-toner printing device to a printing device with toner;
(iii) redirecting at least a portion of a print job from a first printing device having a lower toner level to a second printing device having a higher toner level.

4. A method as recited in claim 1, wherein the order is further based on an availability status of each of the plurality of printing devices.

5. A method as recited in claim 1, wherein the order is further based on a size of a particular print job.

6. A method as recited in claim 1, wherein monitoring toner use comprises monitoring a toner status, and wherein the order is based on the toner status of the plurality of printing devices.

7. A method as recited in claim 6, wherein the toner status for each of the plurality of printing devices is one of: (i) toner available; (ii) low toner; and (iii) no toner.

8. A method as recited in claim 7, wherein the toner available status and low toner status are further characterized by their particular levels of toner specified as a percentage of remaining toner.

9. A method as recited in claim 7, wherein the order includes a round-robin process for providing the print jobs to printing devices having a similar toner status.

10. A method as recited in claim 7, wherein the order includes rendering at least a portion of a large print job at a printing device having a toner available status.

11. A method as recited in claim 7, wherein the order includes rendering at least a portion of a small print job at a printing device having a low toner status.

12. A method as recited in claim 1, wherein monitoring toner use comprises monitoring a toner level.

13. A method as recited in claim 12, wherein the order is based on the toner level of the plurality of printing devices.

14. A system for dynamically rendering print jobs based on toner information, the system comprising:
a computer device; and
a plurality of printing devices coupled to the computer device for selective rendering of print jobs, wherein the system is configured to dynamically utilize the plurality of printing devices to render the print jobs based on a toner level to balance toner use within the system for the rendering of print jobs, whereby the system is configured to:
use a round-robin process to distribute print jobs among only printing devices having a toner OK status until all printing devices reach a toner low status; and
use a round-robin process to distribute print jobs among all printing devices having a toner low status to level out final toner consumption.

15. A system as recited in claim 14, wherein the computer device is a client computer device, and wherein the plurality of printing devices are coupled to the client computer device via a network.

16. A system as recited in claim 15, further comprising a server coupled to the network, wherein at least one of (i) the client computer device and (ii) the server is configured to dynamically determine an order for utilization of the plurality of printing devices to render the print jobs.

17. A system as recited in claim 14, wherein the toner level is monitored by at least one of:
the computer device;
(ii) a second computer device; and
(iii) a print controller.

18. A computer program product for implementing within a computer system a method for load balancing toner use in a system that includes a plurality of printing devices, the computer program product comprising:
a non-transitory computer readable medium for providing computer program code means utilized to implement the method, wherein the computer program code means is comprised of executable code for implementing:
automatically monitoring toner use by each of the plurality of printing devices configured to render print jobs;
dynamically establishing an order for using the printing devices to render the print jobs, wherein the order is based on toner information; and
causing the plurality of printing devices to more evenly consume their respective toner by using the order to select printing devices to render the print jobs as the print jobs are initiated so that the printing devices have similar respective toner consumption rates comprising:
using a round-robin process to distribute print jobs among only printing devices having a toner OK status until all printing devices reach a toner low status; and
using a round-robin process to distribute print jobs among all printing devices having a toner low status to level out final toner consumption.

19. A computer program product as recited in claim 18, wherein dynamically establishing an order further comprises dynamically re-establishing the order for using the printing devices to render the print jobs based on updated toner information.

20. A computer program product as recited in claim 19, wherein dynamically re-establishing the order for using the printing devices to render the print jobs comprises one of:

(i) redirecting at least a portion of a print job from an out-of-toner printing device to a printing device with toner;
(ii) redirecting at least a portion of a print job from a low-toner printing device to a printing device with toner; and
(iii) redirecting at least a portion of a print job from a first printing device having a lower toner level to a second printer device having a higher toner level.

21. A computer program product as recited in claim 18, wherein the order is further based on at least one of:
   (i) an availability status of each of the plurality of printing devices; and
   (ii) a size of a particular print job.

22. A computer program product as recited in claim 18, wherein automatically monitoring toner use comprises monitoring a toner status, and wherein the order is based on the toner status of the plurality of printing devices.

23. A computer program product as recited in claim 22, wherein the order includes a round-robin process for providing the print jobs to printing devices having a similar toner status.

24. A computer program product as recited in claim 23, wherein the order includes:
   (i) rendering at least a portion of a large print job at a printing device having a toner available status; and
   (ii) rendering at least a portion of a small print job at a printing device having a low toner status.

25. A computer program product as recited in claim 18, wherein automatically monitoring toner use comprises monitoring a toner level.

26. A computer program product as recited in claim 25, wherein the order is based on the toner level of the plurality of printing devices.

* * * * *